United States Patent [19]
Payne et al.

[11] Patent Number: 6,092,090
[45] Date of Patent: Jul. 18, 2000

[54] MANAGEMENT SYSTEM FOR DOCUMENTS STORED ELECTRONICALLY

[75] Inventors: Daniel H. Payne, Orinda; Leonard C. Schmitt, Benicia, both of Calif.

[73] Assignee: BHP Minerals International Inc., San Francisco, Calif.

[21] Appl. No.: 08/584,536

[22] Filed: Jan. 11, 1996

[51] Int. Cl.$^7$ .................................................. G06F 17/21
[52] U.S. Cl. ........................................ 707/530; 707/505
[58] Field of Search ............................ 707/2, 3, 10, 102, 707/104, 200, 205, 505, 530; 358/468

[56] References Cited

PUBLICATIONS

"Why Microsoft Can't Stop LOTUS NOTES" by David Kirkpatrick, Dec. 12, 1994 issue of *Fortune*; pp. 1–6.
"cc:Mail and Notes Today: Complementary Architectures", General Discussion by Price Waterhouse Apr. 11, 1994, pp. 1–7.

*Primary Examiner*—Stephen S. Hong
*Attorney, Agent, or Firm*—Hopgood, Calimafde, Kalil & Judlowe

[57] ABSTRACT

A system for managing large quantities of business related documents stored electronically requires little or no reliance on the corresponding hardcopy versions. The management system data includes a processing approach that allows for the creation of documents electronically, i.e., by virtual documents the system users in concert with their everyday business activities—thus overcoming the previous difficulty in implementing paperless office environments. In particular, essentially all documents are stored as system available image files on a central image server. Organization of these image based virtual documents are created during initial document review by the users having review responsibilities in the first instance. During the review process, the system provides a highly intelligent user interface which permits the creation of indexing values corresponding to the document in a highly simplified and intuitive manner. This permits the rapid and burden free preparation of document indices to support useful interaction with the image based virtual document—thus eliminating the need for any supporting hardcopy.

2 Claims, 6 Drawing Sheets

MANAGEMENT SYSTEM FOR DOCUMENTS STORED ELECTRONICALLY

FIELD OF THE INVENTION

The present invention generally relates to systems and software for managing document processing in a business environment. In particular, the present invention relates to a data processing system that integrates discrete programming tools and system protocols permitting office document management wherein the actual hardcopy document record keeping is replaced by a virtual document environment.

BACKGROUND OF THE INVENTION

Document management has been of keen interest in almost all business endeavors. Hardcopy documents form the backbone of essentially all record keeping systems and record keeping is per se critical in the effective management of all office activities. Hardcopy documents—otherwise known as the paper trail—reflect the retained memory of the passing business activity and are used for both ongoing business practices and archival purposes.

Hardcopy or paper information storage takes advantage of the fact that paper is an extremely inexpensive memory medium—costing a fraction of a cent for each kilobyte of information stored (in binary terms). However, there are important drawbacks to using paper as a storage medium. From a space standpoint, paper can comprise a surprisingly large space. Typical office filing cabinets can approach twenty to thirty percent of usable floor space in an office environment. This floor space may be quite expensive in terms of rental and other fixed expenses. It also may represent an appreciable lost opportunity cost as the space might be more efficiently employed for other purposes.

Another important weakness in hardcopy document information storage lies in the fact that paper records are not easily searched. This is particularly true when the database of records grows to include many years of recorded business activity—a process typical of almost all business activity. The only feasible searching technique available for hardcopy document records relies on the creation of separate indices and the consistent filing of records in accordance with pre-defined categories. The use of separate indices allows some manual searching of the database, but is prone to filing errors that may defeat the search logic. Moreover, once a particular record is located, it must be physically removed from the system to be used. This creates the potential for misfiling upon re-entry of the record to the system and further only a single user may access the record at a time.

The advent of computer-based storage and retrieval has offered some attractive alternatives to hardcopy record keeping. Computers utilize binary coding regimens to store the information normally found on paper documents with nonvolatile storage of the coded information via magnetic tape, disk, or optical disk data retention. Indeed, the current price—capacity of electronic storage has been dropping substantially over the past two decades. Although still expensive in comparison to paper data storage, electronic storage offers many benefits—not the least of which is the preservation of natural (wood fiber source) resources otherwise consumed in paper manufacture. Other important advantages with electronic document storage includes the use of powerful searching tools to gain rapid access to the stored data and the mutual access to the data by concurrent users of the system.

These advantages of electronic storage have of course been well known within business management. And to some extent, businesses have been switching to electronic document storage on some very limited scale. However, the use of document record keeping, via electronic storage, has largely been limited to the fringes—sporadic and not well structured. Even after two decades of examination, large scale document management by electronic means—the paperless office—remains an elusive dream. In some ways, this is not surprising as the practices of many generations are difficult to change. Indeed, the true cause for a failure in document advancement has been the inability of current systems to coordinate electronic document management in a manner that permits large scale adoption in conventional business practices.

As such the present invention addresses the problems of the prior art and provides a solution to this long pending issue.

OBJECTS AND SUMMARY OF THE PRESENT INVENTION

It is, therefore, an object of the present invention to provide a data processing system that permits large scale use of electronic information storage in support of record keeping and business support activities.

It is another object of the present invention to provide a data processing network of workstations, governed by program controlled logic that creates a virtual document environment.

It is yet another object of the present invention to provide a system and methodology that automatically creates virtual documents from the typical daily business correspondence with little or no user hardship or burden.

It is still another object of the present invention to provide a seamless interface for document management that permits rapid electronic indexing and storage of high volumes of period documentation and easy access to stored documents without the necessity of separate hardcopy archives.

The above and other objects of the present invention are realized in a computer based integrated data processing system for enhanced management of document-based records. The system includes select hardware managed by program controlled logic and implemented with established user protocols to vastly reduce the need for hard document information storage. Generally, document management can be expressed in three functional domains. First, documents must be received in the daily activities of the organization. These inputted documents will include both electronic form (e.g., fax, E-Mail) and hardcopy (mail, periodicals).

The second and possibly most critical domain involves incoming document processing. Specifically, the system translates all incoming documents to image or textbased records. These "electronic" documents are then stored in fixed or "non-volatile" memory. Importantly, each document thus stored is separately indexed and assigned to one or more of a fixed and pre-engineered set of databases (DBs). Of critical importance is the process for assigning the documents to select databases and creating an "index entry" for the document. This is done with substantial computer support to the user, making the associated index selection process seamless with the initial review of the document. Accordingly, actual indices are developed in real time without burdening current staff or reducing real time productivity. The highly flexible system includes imbedded logic that permit effortless database creation by users having minimal database management skills.

The third and final domain relates to document output and record keeping. The system integrates known applications to support user document response and permits both transmittals and document storage—again seamlessly with conventional user activities.

The foregoing features of the present invention are more fully and readily understood from the following detailed description of a specific illustrative embodiment thereof, presented hereinbelow in conjunction with the accompanying drawings of which:

DETAILED DESCRIPTION OF THE PREFERRED EMBODIMENTS

First briefly in overview, the present invention provides an operative platform to manage documents during conventional business activities in a manner that precludes the need for hardcopy versions. The system is designed to include sufficient flexibility to be applicable to many different types of business environments. For example, it has been found that the present invention works very effectively in managing tax department document record keeping tasks with almost complete reliance on electronic document archiving. However the techniques are equally applicable to many other business settings—including managing legal litigation teams, hospital and primary care centers, small integrated manufacturing teams and other collective task management operations.

Primary to the success of the present invention is the provision of a pre-defined formalism and protocol for uniformly managing documents. Once defined and observed, the system provides essentially seamless document processing protocols that permit indexing storage and subsequent document access with little additional burden to the user. This is mostly possible due to the blending of the document management functions with those routine functions otherwise required during daily business activity. For example, when a fax is received, its existence is made known to the addressee. When the addressee reads the fax, the system queries the user for select data regarding the fax—subject, author, date, etc. which is inputted into the system in conjunction with the user's reading of the fax. When completed, the fax is then stored by the user—with a simple command. However, during the review process, an index entry on the fax is created—effortless and without notice by the user. This index card now contains sufficient detail of the fax to permit immediate and well defined storage of the document in one or more pre-defined databases. For example, the fax will end up in the correspondence file, the file relating to the author and a third file relating to the subject. However, only a single image of the fax exists—with the multiple file entries representing pointers to that image from one or more file address locations. No hard copy ever is needed and yet the document is almost instantly accessible, via known search techniques.

Figure 1:
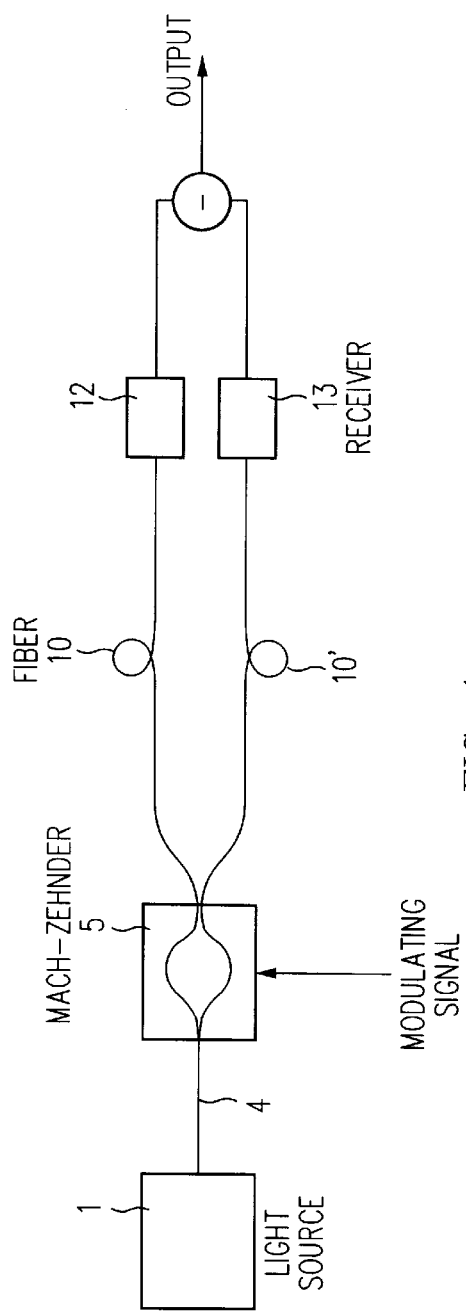
FIG. 1 depicts in functional block diagram form the salient hardware elements associated with the present invention.

With the foregoing overview in mind, attention is now directed to FIG. 1 wherein the hardware system components are presented in functional block diagram form. In this arrangement, three separate workstations are depicted as blocks 10, 20 and 30. Each of these workstations is a stand alone personal computer having a processor equivalent to an Intel pentium or similar. In addition, the workstations include 24 MBs of RAM (active memory) and a hard drive with approximately 340 MB of nonvolatile storage. Suitable operating system configuration includes Windows 3.1 on top of MS-DOS 6.2.

Each workstation is further equipped with client server software including Novell netware and Lotus Notes (client for windows version 3.0C). To support system fax and other image access, the workstations will include fax server client software (e.g., FACSYS R3.4) and LN:DI (Lotus Notes Document Imaging).

Continuing with FIG. 1, the system links the individual workstations to a remote server for image based data; Image Server 40. The image server is a stand-alone processor having a sophisticated array of magnetic storage. A suitable arrangement includes a Compaq Proliant 586/66 with a 5X 1.0 GB Raid disk array for storing document in image format. Image Server 40 includes an OS/2 operating system—providing stable 32 bit cpu processing, with applications for supporting Notes (Lotus Notes Client for OS/2 v3.1.5, an OS/2 Netware Requester 2.1.0 and an LN:DI Server for OS/2 v2.0). Image Server 40 thereby configured is in communication with each of the plural workstations. The second, Index Server 50 is also a stand-alone processor such as a Proliant 586/66 with a 5X 1GB Raid Disk array on an OS/2 platform. This server includes Notes Server for OS/2 V3.0C and OS/2 netware Requester 2.1.0. As its name implies, this server provides the links to the images stored on Image Server 40 in a manner that will be explained in more detail below. Communication between the various hardware elements of the system is managed by the Network Server 60, which includes per se well-known software configuration to provide server/client interaction. The final server is Fax Server 70 which is linked to telephone trunk lines to provide sufficient phone line capacity to support the fax image volume for the requisite number of workstations. Fax Server 70 is a stand-alone system, such as a Compaq Prosignia 486/66 with 1 GB and 16 MB memory. It operates with an OS/2 platform, Lotus Notes Server for OS/2 V3.1.5, Lotus Notes Inbound and outbound fax gateways, Gammalink CPD cards for the DID trunk lines, and CPi cards for the x7401 phone links.

The final hardware elements provide for document image capture and include two separate scanner stations. Scanner I (80) is a high speed scanning system controlled by a separately networked workstation—configured with the same networking software but linked to a high speed Fujitsu scanner via a Kofax 9250 card.

The second scanner 90 is a low speed model linked to the system in a similar fashion. Scanner 90 is a HP IIcx unit linked to a dedicated workstation via scsi card.

Figure 2:
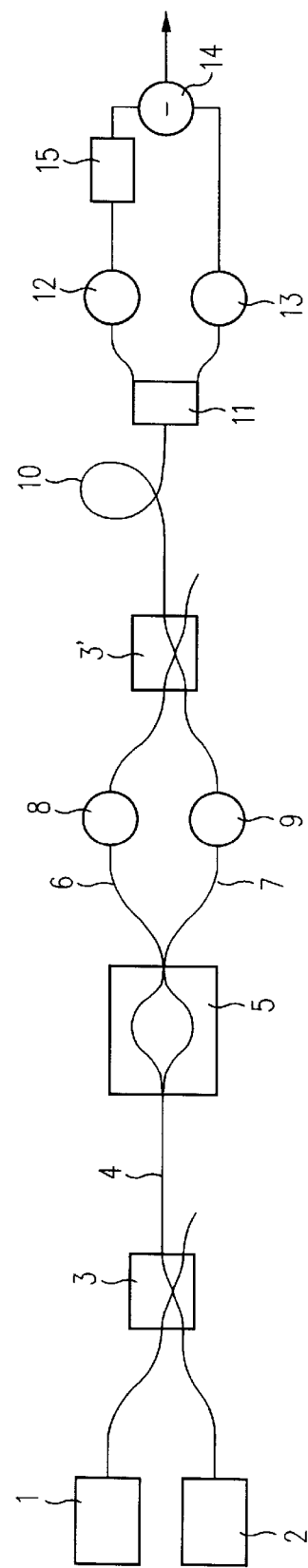
FIG. 2 depicts a simplified database structure presented in a generic application of the present invention.

Turning now to FIG. 2, the database structure and linkage to the system users are depicted in functional block format. In particular, starting at block 100, the system provides a plurality of separate databases each of which includes a comprehensive collection of salient information on one or more documents under system management. Each database comprises a series of indices that delineate key document attributes as entered by the system user, taken from the document directly via OCR reading, or independently generated by the computer (e.g., date of document receipt by the system from system clock).

As presented in FIG. 2, each database is separately classified—extending from blocks 100 to 160; the actual number of databases utilized will, of course, depend on the system application. However, it is expected that certain database structures will be common for each implementation of the present invention. For example, DB(1) depicted in block 100 is a database directed to firm correspondence. This database includes the indexing data for all incoming and outgoing correspondence generated during firm operation and thus represents a repository of the firm's interactions with outside the world. This index will include data identifying the author, recipient, date, form of transmission, subject matter, etc. regarding the regular mailings to and from the firm.

Continuing with FIG. 2, it is important to note that the databases identified do not contain the actual document image—only the index information about the document (e.g., correspondence with another company) and the memory address of the document image (file location) in the image server. In fact, the databases may include several separate index entries directed to the same document. For example, a letter to a vendor of the firm may be indexed in both the firm correspondence database, DB(I), and in the database dedicated to firm vendors [e.g., DB(4)] and in the database dedicated to accounts payable [DB(5)]. Notwithstanding these several (or many) different index entries, the document is stored as an image only once. Each database index entry on this document references this single image file address.

Figure 3:
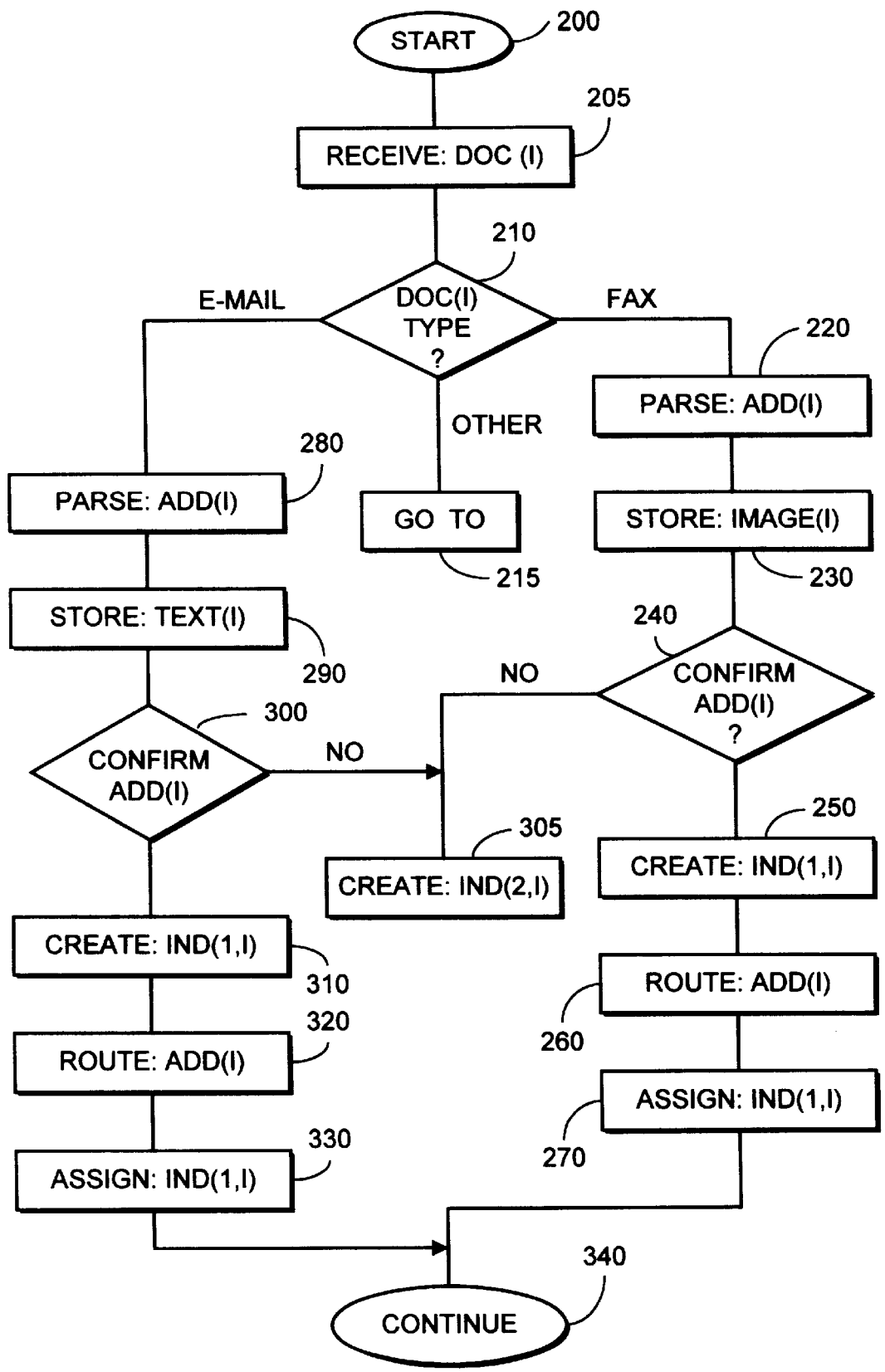
FIG. 3 depicts a logic flow chart for the document input systems.

The foregoing discussion has focused on the document storage within the system. Virtual documents in memory are based on actual documents utilized by the firm and the system provides for the conversion thereof into the virtual representation. This is explained in FIG. 3 directed to incoming firm documents. System logic begins at block 200 receives DOC(I), block 205, and flows to test 210, wherein the system determines the form of the incoming document to be processed. The system recognizes three forms of documents inputted to the system, facsimiles via telephone trunk lines represent a significant source of incoming documents. These are advantageously handled by the system as they are not in hardcopy form to begin with and, in fact, are received in an image format recognized by the system. In the preferred embodiment, the system provides for an individual fax address for each potential fax recipient. If the system receives an incoming fax, this is recognized at test 210 and logic branches to block 220 wherein the fax recipient address is parsed from the source of the incoming fax and given the variable ADD(I). At block 230, the actual fax image is routed to the image server 40, compressed and stored as an image within the memory core of the server 40 at a newly assigned memory location.

At test 240, the system confirms that the ADD(I) discerned from the incoming fax exists, ("yes" to test 240). An index entry is then opened and assigned to the memory address of the image file and the recipient address, ADD(I) at block 250. In this context, ADD(I) identifies one of the plural workstations presented in FIG. 1 and a particular user of that workstation. Thus, at block 260, a message is sent to the workstation via E-mail or similar that a fax has been logged and entered in the recipient's name. This informs the user that the fax is now inputted as a partially indexed virtual document in the system. As will be described in more detail below, the partial index entry will eventually be completed forming one or more links to the image file amongst the various databases. At block 270, the index entry is assigned to the correspondence database, DB(1), as a fax. Of course later, after its review, the fax may be assigned to and reside in other databases depending on its content.

The system handles E-mail in a similar way—with the differences based on the fact that E-mail is a text based entry with no need to create a corresponding image file. Accordingly, the system parses the E-mail address from the received input, block 280 and stores the associated text in a text based file, block 290. At test 300, the addressee is confirmed by the system with negative ADD(t) branching logic to block 305 and the entry in a separate index (directed to non-conforming addressees). Assuming a proper address, the index entry is created, IND(1,I) at block 310 and the message is routed to the workstation/user at block 320. It is then assigned to the database that, at this juncture is used for storing incoming E-mail messages. Logic passes to block 340 and the system continues accordingly.

If the system receives other forms of incoming documentation, such as regular mailings, magazines, Express Mail, etc. (hardcopy), logic is routed to a separate, scanner based subsystem for manual conversion of the hardcopy into image format, block 215. However, once the mail is scanned, the process of creating an initial index entry and routing to the user workstation listed as the addressee is essentially the same as that outlined above. As with the incoming faxes, the scanned documents are compressed prior to storage in the image server. The compression takes a page image requiring approximately 35 to 50 kbytes and reduces the storage footprint to 10–15 kbytes. Each workstation is similarly equipped with re-expansion programming to convert the compressed stored image to machine displayable form.

Other documents to be managed by the system include text formatted documents generated by per se well-known word processing software, e.g., WordPerfect, Word, etc. These documents are neither scanned nor based on image format records. These are processed in a similar manner to that described above regarding incoming E-mail, and use a function in Lotus Notes known as the paperclip function—which attach the file to the index entry for easy and direct access. The text based documents will reside on the Index Server 50.

To insure proper handling of all documents that are inputted by the various techniques outlined above, the system relies on compliance with a pre-set of protocols—rules that define operating procedures. This insures uniform and complete management of the virtual documents. This is exemplified by the process of creating index entries for newly entered documents. The protocol is to have all such documents initially entered as incoming mail to one specific workstation—thereby insuring that the workstation user will review and process the virtual document—be it a fax, word processing document, spreadsheet, or article. Indeed, outgoing faxes from a workstation will also be "faxed" to the workstation to insure that it is filed in the correspondence database and further indexed in accordance with the other relevant databases, via the incoming mail to the workstation.

The above description is directed to Lotus Notes E-mail; a separate facility exists for any other E-mail entering the system. To handle external E-mail, the system requires the creation and attachment of a separate file corresponding to the external E-mail input. In this way, external E-mail is accommodated in a manner similar to other office automation files.

Figure 4:
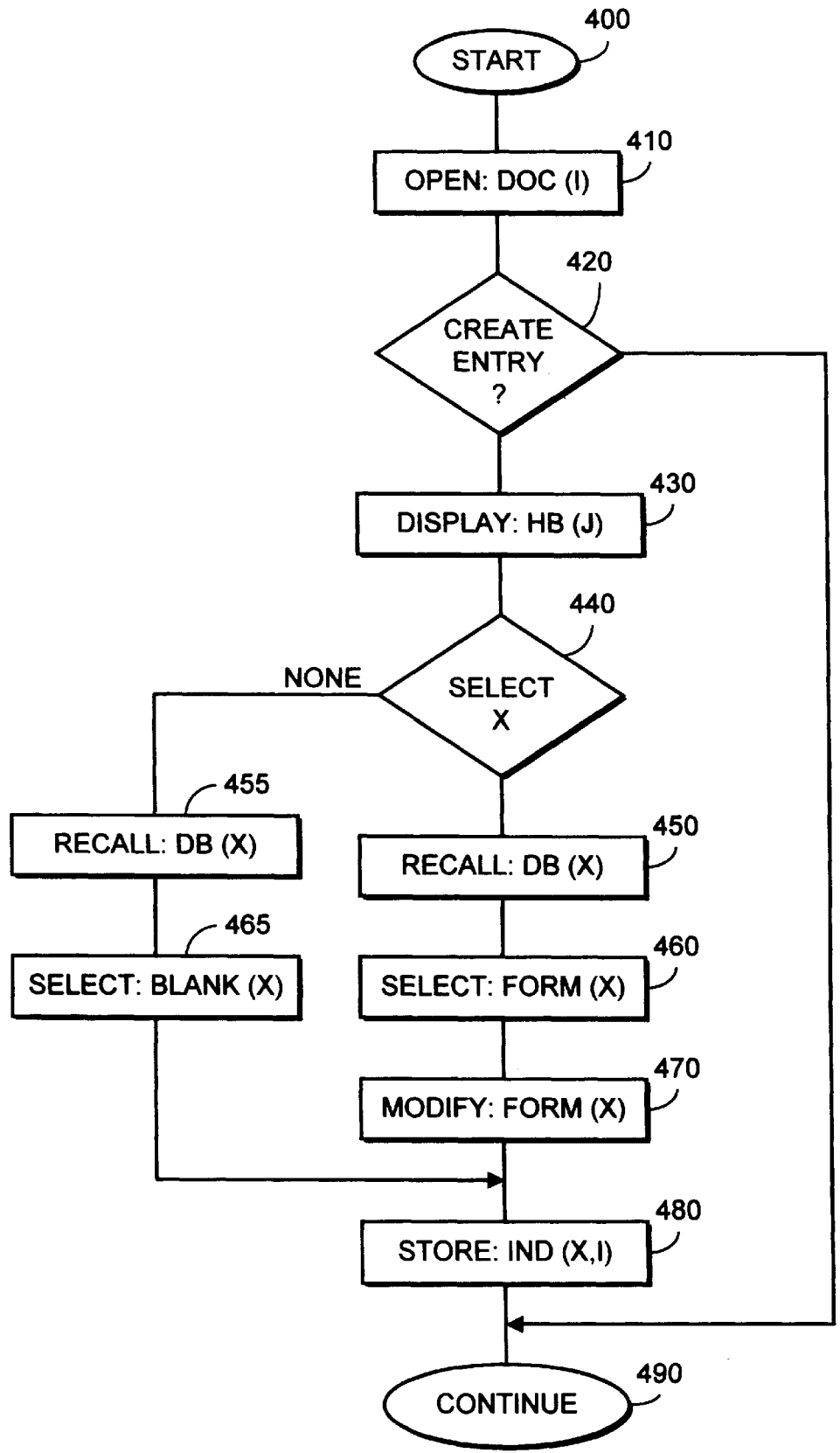
FIG. 4 depicts a logic flow chart for the document index creation process in the present invention.
Figure 5:
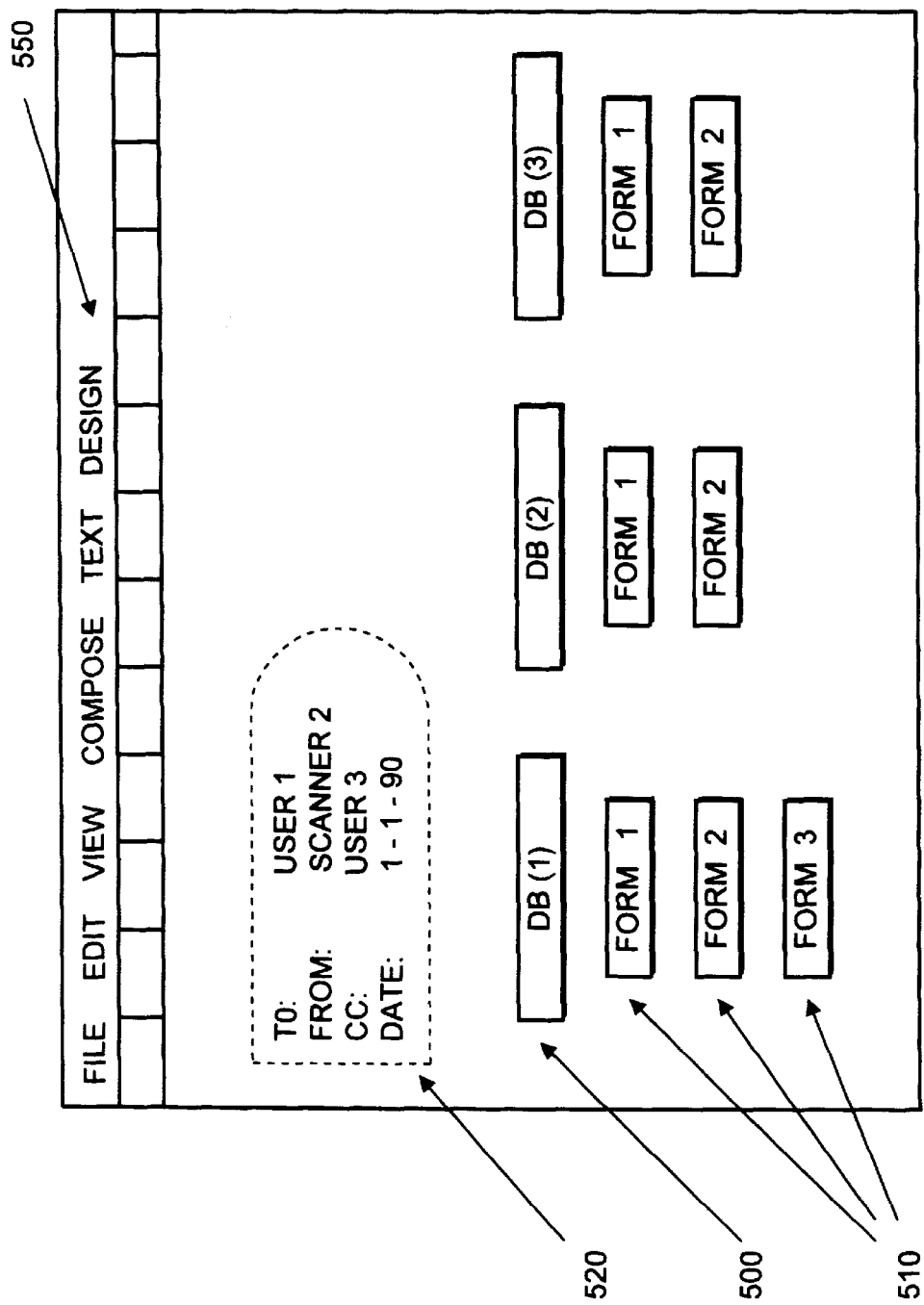
FIG. 5 depicts a screen display utilized in the index creation process in accordance with the present invention.

Turning now to FIG. 4, the logic for directing the index entry system is depicted in more detail. Conceptually, logic begins at block 400 and continues to block 410 wherein the document to be indexed is accessed and opened as DOC(I). This may be a previously received fax that was routed to the users mailbox and is now being examined for the first time. At test 420, the user determines whether to pursue indexing or forego to a later time. A positive response to test 420 passes logic to block 430 and the display of the possible document types available for indexing. These are presented as hot buttons on the display screen for easy point and click access via mouse or similar. A typical hot button display screen is shown in FIG. 5, wherein the various document types are classified by the resident database for the specific documents. In particular, tabs 500 are the individual databases discussed earlier; beneath each are the available hot buttons used to access the specific document type which is characterized by a form structure for data input. As presented in FIG. 5, three different forms 510 reside and populate DB(I) and are available to select as a template for the currently assessed document. Similarly, two form templates reside in the second and third databases and thus are available for use in categorization of the current document.

Returning to FIG. 4, logic continues to test 440 wherein the user selects one of the displayed hot buttons—designated X for tracking purposes. However, if no Hot Button is selected at test 440 logic branches to block 455 for creation of an index without the benefit of a previously completed form—at block 465—a blank form is presented. It is expected that once properly configured, the system will have responsive templates for essentially all virtual documents presented. However, during the initial period of usage, block 465 permits the creation of custom forms that can be added to the DBs for later use.

A positive template selection via Hot Button(X) at test 440 passes logic to block 450 for recall of the selected database and block 460 for selection of a previous document from the database to be used as a template. Of course, selection of a previous document from the database will include prior data that is not valid for the current document being indexed. Thus at block 470, the data is modified in the old document type to now represent the new document. The new values are then stored as a new index entry identifying the new document—and designated IND(X,I), block 480. Logic continues to the next iteration, block 490.

As stated above, the use of a previous index entry as a template for the new index makes the creation process substantially faster and more intuitive, as the user is at most only updating one or more fields—and not creating the entire index entry from scratch. This has been found to be highly beneficial, particularly in the processing of documents that have recurring schedules or periodic updates with little or no additional data. An example of this is in the field of tax management and tax form preparation—an endeavor that is otherwise highly paper intensive. Quarterly statements to the IRS often are complex—but change infrequently thus permitting advantageous use of the previous filing as a template for the current document.

Figure 6:
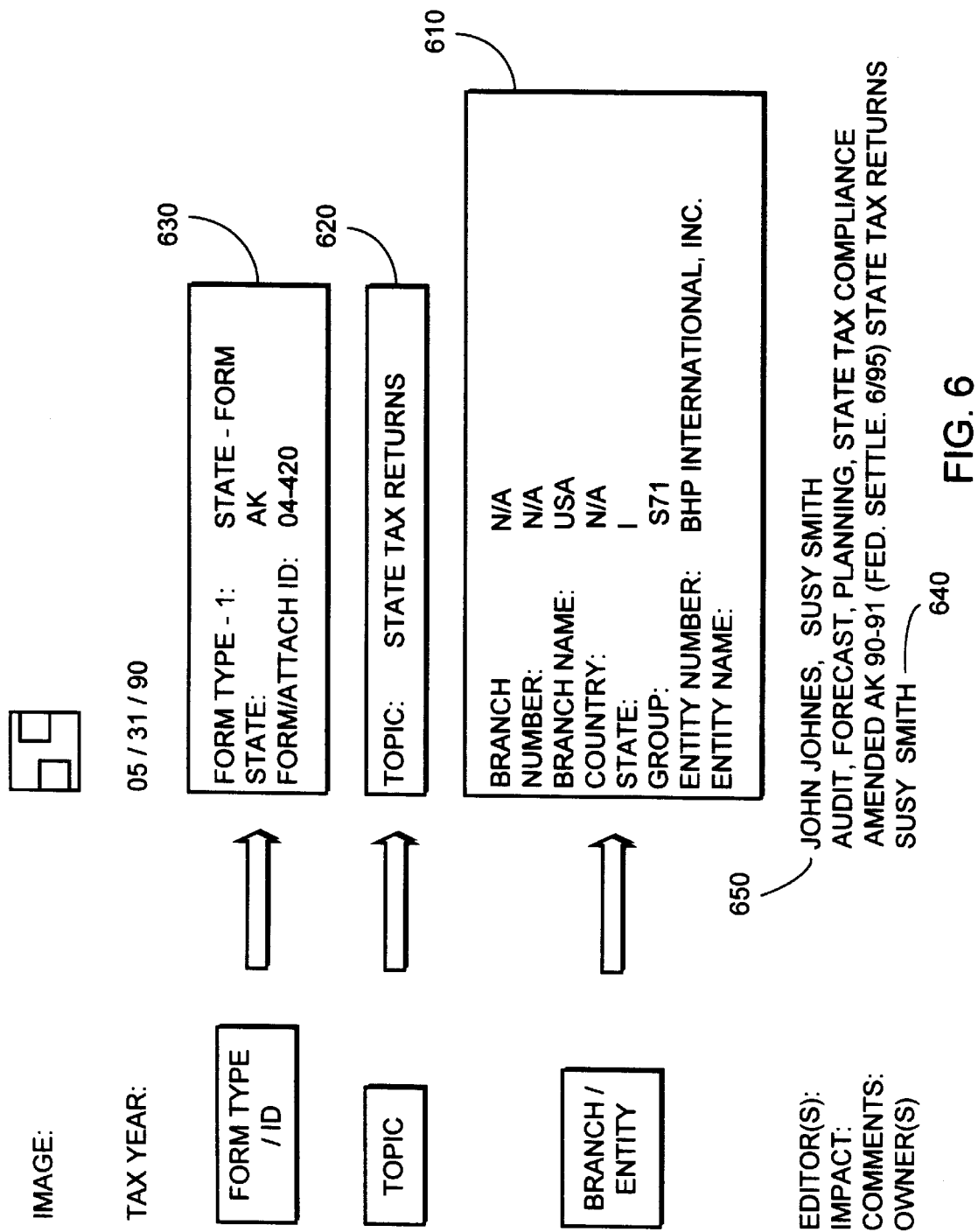
FIG. 6 depicts a screen display utilized in the document form preparation sequence in accordance with the present invention.

In addition to the use of prior data to partially complete the index, the present system includes imbedded logic for displaying one or more "pick lists" during the index completion operation. Reference is now made to FIG. 6 which presents a sample document form. As shown, the form includes several fields specific to the data associated with the document type being indexed. In particular, three fields are depicted; Form Type 630, Topic 620 and Branch/Entity 610. These fields are completed by the user during the document review process, and as such do not involve a significant increase in the user's tasks. Specifically, when a field is selected for a new value, the system performs two operations. It first determines the context of the document and field entry space relative to the database structure; based on this context, the system groups a "pick list" of likely candidates for entry into the field. This pick list is then displayed adjacent to the field. If the list is lengthy, a scroll bar is provided to allow simple perusal of the entire list content. The user selects one of the pick list entries for the field, which is then automatically placed into the field and becomes part of the updated index for that document. Alternatively, the user can decide to type into the field a value or name not found on the pick list—once saved with the index entry, the newly entered value becomes resident in the pick list and available for the next iteration based on similar context sensitive recall. In addition, information regarding the author—owner and editors and recipients may be provided on the screen lower section. This information is important in managing the documents future status in terms of storage access and deletion.

Figure 7:
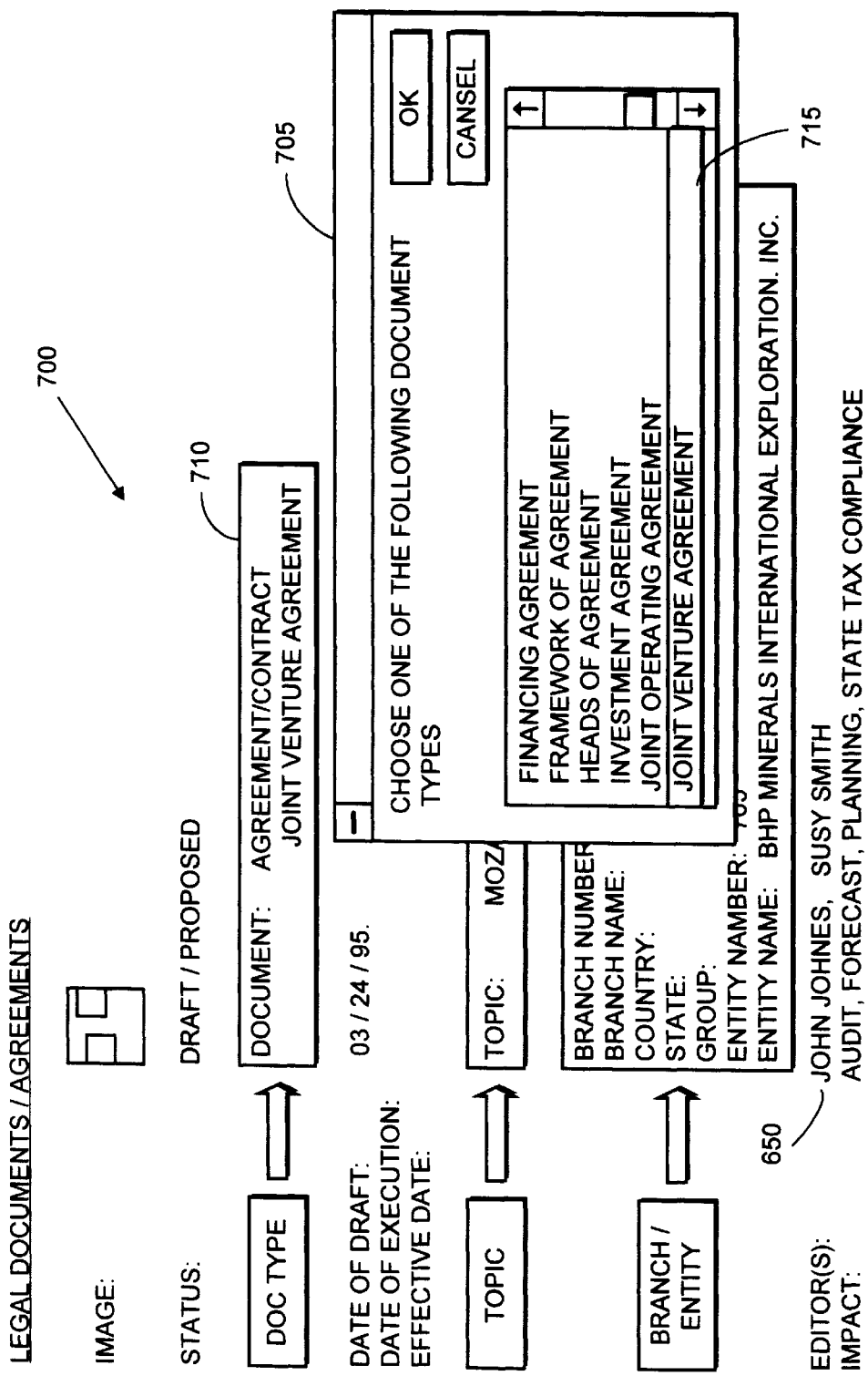
FIG. 7 depicts a screen display utilized in the field completion process of the present invention.

The above pick list manipulations can be better understood by reference to FIG. 7. In this Figure, the display 700 includes multiple fields requiring completion, eg, field 710 relating to the DOC/TYPE. Entry into a field triggers the display of a box 705 comprising a series of probable selections for the field being completed. The pick list thus displays the likely candidates for entry into the current field enabling the user to simply click on the desired entry. In this example, the desired entry is Joint Venture Agreement 715 which is highlighted. This selection once made is then transferred to the field for final recordation.

EXAMPLE

The forgoing system is applicable in a wide range of business operations. It has been found to be particularly efficient in the document management processes associated with the practice of law and, in particular, the practice of international tax law. In this application and referring to FIG. 2, the associated database structure is given the following delineation:

DB(1)-Non-compliance Database—This database is broken into several subcategories and encompasses the documents associated with tax filings.

DB(2)-Administration Database—This database is directed to administrative documents, such as departmental reporting responsibilities and similar.

DB(3)-Expatriate Database—Documents relating to expatriate matters are stored in this database, including loan requests and analysis.

DB(4)-Correspondence Database—This database has been previously discussed and includes a broad range of simple and complex correspondence.

DB(5)-Periodicals Database—This database is in a sense a library of periodicals, specific articles and other such informational materials that may be received by the office from time to time.

DB(6)-Compliance database—This database includes information regarding tax compliance issues specific to corporate tax return preparation.

In accordance with the above structure, the index entry forms and associated pick lists are designed and populated with tax specific fields and entries. Thus, a user seeking to coordinate document entry on tax related matters will be presented with default values and prompts specific to the tax matters. See, e.g., entries for FIG. 7.

A further database is provided to manage information that is discarded from the system, which works in conjunction with protocols regarding how data is removed from the system. There are two important aspects of information and/or record deletion. The first aspect relates to deletion authorization. In particular, the system provides a coordinated paradigm for deletion authorization wherein individuals having access to data records also have selected and pre-establish authority as it relates to data removal. In particular, depending on role/responsibility, keyed entry access to data and its ultimate disposal depends on users status within the system. For example, if the user is the author of the document, he/she has full authority to discard. If a system administrator, this authority will also attach. However, individual users will not normally be allowed to remove data placed in the system by others, even those who are given direct access to the data via copy recipient or other.

The second aspect of data/file deletion pertains to the mechanism of excision employed. In particular, the system provides a separate dedicated database for storing deleted files. Thus, even after initial deletion, the index information is retained for a pre-defined period. This is a fail-safe arrangement to prevent accidental and irreversible deletion.

Since other modifications and changes varied to fit particular operating requirements and environments will be apparent to those skilled in the art, the invention is not considered limited to the example chosen for the purposes of disclosure, and covers all changes and modifications which do not constitute departures from the true spirit and scope of this invention.

What is claimed is:

1. A method for managing documents in electronic form, comprising:

receiving and storing, in an addressable memory location of a document input means, document based information in electronic virtual document representations, said step of receiving and storing in the document input means is performed on an electronic virtual text representation;

characterizing, via a document indexing means, the contents of the virtual document representations in accordance with one of plural pre-defined database document structures by displaying on a preprogrammed workstation of the indexing means one of plural predefined index forms having plural fields for information entry corresponding to a virtual document representation being indexed, displaying the contents of the virtual document representation corresponding to the displayed index form, and entering information into an index form corresponding to the virtual document representation being indexed wherein the information is related to the contents of the virtual document representation, said step of entering being contemporaneous with said displaying of the contents of the virtual document representation, said characterizing step being performed on the electronic virtual text representation;

receiving and storing, in an addressable memory location of an index storage means, an electronic virtual representation of the index form containing information resulting from said entering step, said step of receiving and storing in an index storage means being performed on an index form corresponding to the virtual text representation; and linking each stored virtual document representation to one or more index entries providing user access to the stored virtual document representation, said linking step being performed on the virtual text representation and corresponding index form.

2. A method for managing documents in electronic form, comprising:

receiving and storing, in an addressable memory location of a document input means, document based information in electronic virtual document representations, said step of receiving and storing in the document input means is performed on an electronic virtual image representation;

characterizing, via a document indexing means, the contents of the virtual document representations in accordance with one of plural pre-defined database document structures by displaying on a preprogrammed workstation of the indexing means one of plural predefined index forms having plural fields for information entry corresponding to a virtual document representation being indexed, displaying the contents of the virtual document representation corresponding to the displayed index form, and entering information into an index form corresponding to the virtual document representation being indexed wherein the information is related to the contents of the virtual document representation, said step of entering being contemporaneous with said displaying of the contents of the virtual document representation, said characterizing step being performed on the electronic virtual image representation;

receiving and storing, in an addressable memory location of an index storage means, an electronic virtual representation of the index form containing information resulting from said entering step, said step of receiving and storing in an index storage means being performed on an index form corresponding to the virtual image representation; and linking each stored virtual document representation to one or more index entries providing access to the stored virtual document representation, said linking step being performed on the virtual image representation and corresponding index form.

* * * * *